(12) United States Patent
Yoshida et al.

(10) Patent No.: US 11,947,921 B2
(45) Date of Patent: Apr. 2, 2024

(54) DOCUMENT CREATION SYSTEM, SERVER, AND METHOD

(71) Applicant: SHIMADZU CORPORATION, Kyoto (JP)

(72) Inventors: Takeshi Yoshida, Kyoto (JP); Atsushi Matsudaira, Kyoto (JP); Okiyuki Kunihiro, Kyoto (JP); Maki Fukui, Kyoto (JP); Yasuo Kakude, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/070,437

(22) Filed: Nov. 28, 2022

(65) Prior Publication Data

US 2023/0169277 A1    Jun. 1, 2023

(30) Foreign Application Priority Data

Nov. 29, 2021   (JP) .................. 2021-192842

(51) Int. Cl.
| | | |
|---|---|---|
| *G06F 17/00* | (2019.01) | |
| *G06F 40/226* | (2020.01) | |
| *G06F 40/40* | (2020.01) | |
| *G06Q 30/018* | (2023.01) | |

(52) U.S. Cl.
CPC ............ *G06F 40/40* (2020.01); *G06F 40/226* (2020.01); *G06Q 30/018* (2013.01)

(58) Field of Classification Search
CPC ...... G06F 40/40; G06F 40/226; G06Q 30/018
See application file for complete search history.

(56) References Cited

U.S. PATENT DOCUMENTS

| | | | |
|---|---|---|---|
| 2002/0107652 A1* | 8/2002 | Andrews ................ | G01N 30/88 702/104 |
| 2019/0171469 A1* | 6/2019 | Gopalakrishnan .... | G06F 40/169 |
| 2021/0190739 A1* | 6/2021 | Kimoto .................. | G01N 30/06 |

FOREIGN PATENT DOCUMENTS

JP        2007101564        4/2007

OTHER PUBLICATIONS

Marín Román, José Xavier. "Equipment Validation Standardization for Project Implementation Time Reduction of Automated Manufacturing Platforms." Manufacturing Engineering; (2012) (Year: 2012).*

Ghosh, Somsubhra, B. V. V. Ravikumar, and B. Mahanti. "An Updated & Modern Concept of Validation." PharmaTutor 3.6 (2015): 16-20 (Year: 2015).*

Rozet, Eric, et al. "Analysis of recent pharmaceutical regulatory documents on analytical method validation." Journal of Chromatography A 1158.1-2 (2007): 111-125 (Year: 2007).*

\* cited by examiner

*Primary Examiner* — Andrew T McIntosh
(74) *Attorney, Agent, or Firm* — JCIPRNET

(57) ABSTRACT

A validation document while responding to a customer's demand is efficiently created. A server creates a first sample document upon receiving, from a terminal device, a request for creation of the first sample document including an inspection item targeted for a first device. The terminal device receives an operation of inputting the parameter value to the first sample document, and transmits the inputted parameter value to the server. The server creates a first validation document on the basis of the parameter value received from the terminal device and on the basis of the first sample document.

9 Claims, 15 Drawing Sheets

FIG. 3

DATABASE 50

51

| VALIDATION XX | FRAGMENT DOCUMENT (PROCEDURE/REPORT) |
|---|---|
| DEVICE | |
| DEVICE A | DOCUMENT A1001 (ver. 3.1)<br>DOCUMENT A1002 (ver. 1.2)<br>DOCUMENT A1003 (ver. 3.1)<br>... |
| DEVICE B | DOCUMENT B1001 (ver. 3.1)<br>DOCUMENT B1002 (ver. 3.1) |
| ... | |

52

| CUSTOMER ID | SAMPLE DOCUMENT CREATION DATE (Release) | SOURCE FILE INFORMATION |
|---|---|---|
| No.111111 | 2021.08.01 | DOCUMENT A1001 (ver. 3.1)<br>DOCUMENT A1003 (ver. 1.2)<br>DOCUMENT A1008 (ver. 1.0) |
| No.222222 | ... | ... |
| ... | ... | ... |

53

| CUSTOMER ID | VALIDATION DOCUMENT COMPLETION DATE (Complete) | SOURCE FILE INFORMATION |
|---|---|---|
| No.111111 | 2021.08.31 | DOCUMENT A1001 (ver. 3.1)<br>DOCUMENT A1003 (ver. 1.2)<br>DOCUMENT A1008 (ver. 1.0) |
| No.222222 | ... | ... |
| ... | ... | ... |

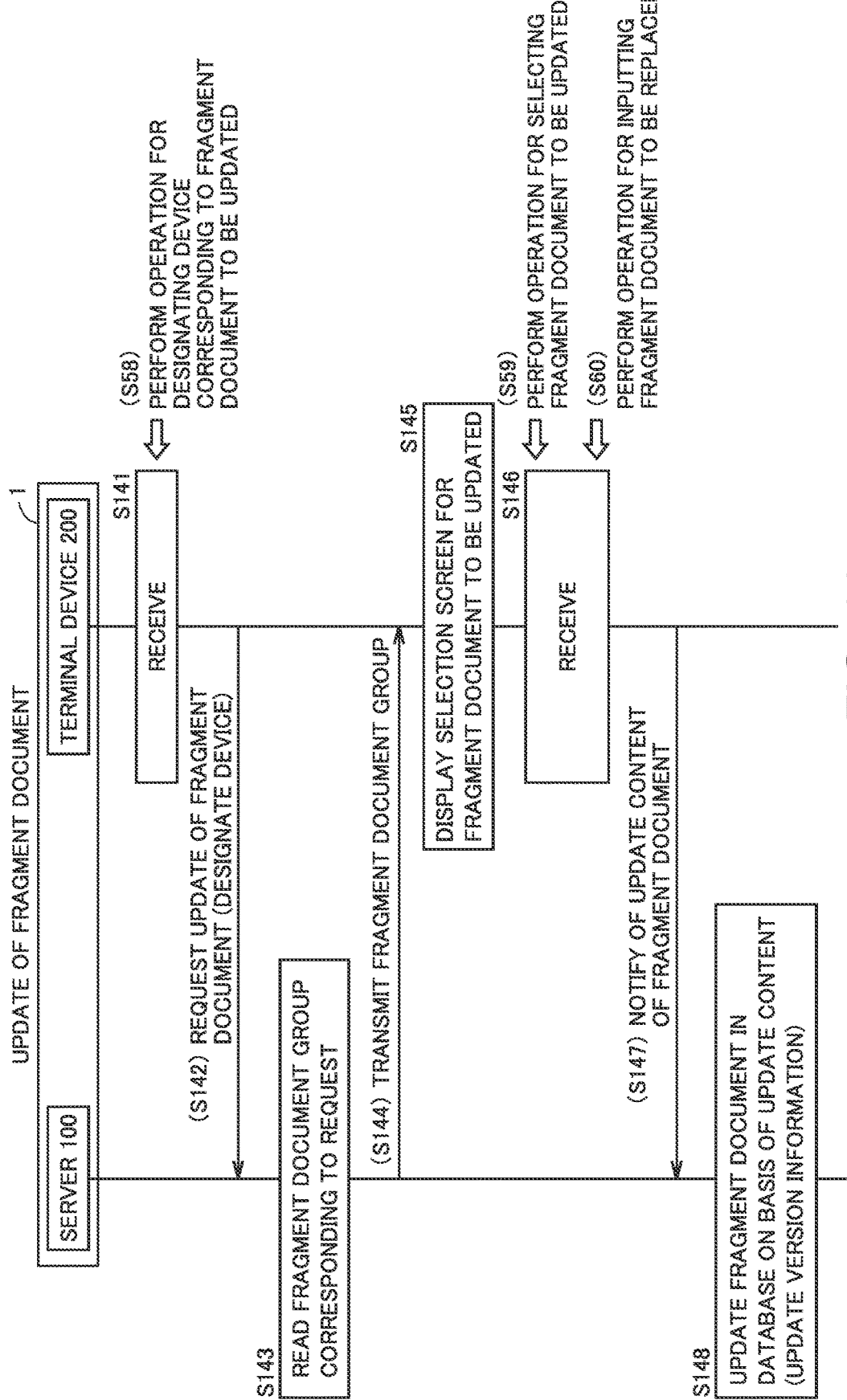

CREATION OF SAMPLE DOCUMENT

DEVICE INFORMATION

[ LC-MS ▾ ] 211

DOCUMENT INFORMATION

DOCUMENT TYPE
- ⦿ NEW INSTALLATION (EQP + IQ + OQ)
- ○ NEW INSTALLATION (IQ + OQ)
- ○ PERIODIC INSPECTION (OQ ALONE)
212

- ☑ EQP: EQUIPMENT QUALIFICATION
- ☑ IQ: INSTALLATION QUALIFICATION
- ☑ OQ: OPERATIONAL QUALIFICATION
- ☐ PQ: PERFORMANCE QUALIFICATION
- ☐ PM: PREVENTIVE MAINTENANCE
- ☑ RQ: POST REPAIR RE-QUALIFICATION
213

FIG. 12

SELECTION OF
FRAGMENT DOCUMENT

| SECTION | NECESSITY |
|---|---|
| SECTION NAME 1 | ☑ |
| SECTION NAME 2 | ☐ |
| SECTION NAME 3 | ☑ |
| SECTION NAME 4 | ☐ |
| SECTION NAME 5 | ☐ |
| SECTION NAME 6 | ☑ |
| ... | |

FIG. 13

| INPUT OF PARAMETER VALUE 231 | 232 | 233 |
|---|---|---|
| ITEM | ITEM NAME | PARAMETER VALUE |
| 1 | △△△ | 111 |
| 2 | △○△ | 222 |
| 3 | △△○ | 333 |
| 4 | ○△△ | 444 |
| 5 | ○○△ | 555 |
| 6 | ○△○ | 666 |
| ... | | |

FIG. 14

○○○○ Co. Ltd.

Document Number: _____

HPLC SYSTEM
Equipment Qualification Report

| | |
|---|---|
| System ID | HPLC-0001 |
| Customer Document No. | |
| Qualification ID | |

The undersigned performer reports that the Qualification has been successfully completed for the system stated above.

Performer
- Name
- Date
- Signature
- Company

The undersigned reviewer and manager / approver report that the performer has completed the Qualification successfully.

Reviewer
- Name
- Date
- Signature
- Company

Manager / Approver
- Name
- Date
- Signature
- Company

FIG. 15

DOCUMENT CREATION SYSTEM, SERVER, AND METHOD

CROSS-REFERENCE TO RELATED APPLICATION

This application claims the priority benefit of Japanese application serial no. 2021-192842, filed on Nov. 29, 2021. The entirety of the above-mentioned patent application is hereby incorporated by reference herein and made a part of this specification.

BACKGROUND

Technical Field

The present disclosure relates to a document creation system, a server, and a method.

Description of Related Art

In Ministerial Ordinance on Standards for Manufacturing Control and Quality Control for Drugs and Quasi-drugs, "validation" is defined as "to verify and document that the buildings and facilities of the manufacturing site, procedures, processes and other procedures of manufacturing control and quality control (hereinafter referred to as "manufacturing procedure, etc.") provide the anticipated results".

The validation is one of means for ensuring validity of operation of various devices such as an analysis device. Examples of the validation include installation qualification (IQ). The installation qualification is performed to ensure that a newly introduced device is installed in an appropriate environment as designed. For example, Japanese Patent Laying-Open No. 2007-101564 describes installation qualification for a chromatography system as an example of the various devices.

SUMMARY

The validation is performed on the basis of a validation document. In the validation document, an inspection procedure regarding a target device is described for each inspection item, and an input field for input of an inspection result is provided. Therefore, the validation document is a procedure manual in which the inspection procedure is described for each inspection item. In addition, the validation document serves as a report that ensures validity of operation of the device, by the inspection result being described in the input field.

In general, a manufacturer that provides a customer with various devices such as an analysis device as a product prepares a validation document created for each product in advance, in order to efficiently advance validation. In the validation document, parameters to be used for inspection are described for individual inspection items. A person in charge of validation proceeds with inspection for each inspection item. From a relationship between the inspection result and the parameters described for the inspection item, it is determined whether or not the inspection target device satisfies a validation criteria.

Meanwhile, there is a case where a customer individually gives an order regarding a parameter to be used for inspection. When such an order is received, a manufacturer has separately created a validation document corresponding to the order without using an existing validation document. In this way, there has been a problem of being unable to efficiently create a validation document because a manufacturer is not able to use the existing document when the manufacturer individually receives an order for a parameter from a customer.

An object of the present disclosure is to enable efficient creation of a validation document while meeting a customer's demand.

A document creation system according to the present disclosure is a document creation system for creating a plurality of types of sample documents and validation documents. The document creation system includes a server and a terminal device. The plurality of types of sample documents include a first sample document including a plurality of inspection items targeted for a first device and one or more parameter values set for each of the plurality of inspection items, and the plurality of types of validation documents include a first validation document in which a parameter value for each inspection item targeted for the first device is customized. The server creates a first sample document upon receiving, from the terminal device, a request for creation of the first sample document including an inspection item targeted for the first device, and the server transmits the first sample document to the terminal device. Upon receiving the first sample document from the server, the terminal device receives an operation of inputting the parameter value to the first sample document, and transmits the inputted parameter value to the server, and the server creates the first validation document on the basis of the parameter value received from the terminal device and on the basis of the first sample document.

A server according to the present disclosure is a server for creating a plurality of types of sample documents and validation documents. The server includes a processor and a memory. The plurality of types of sample documents and validation documents include a first sample document including a plurality of inspection items targeted for a first device and one or more parameter values set for each of the plurality of inspection items, and the plurality of types of validation documents include a first validation document in which a parameter value for each inspection item targeted for the first device is customized. Upon receiving a request for creation of a first sample document including an inspection item targeted for the first device, the processor creates the first sample document by using data read from the memory, and the processor outputs the created first sample document. Upon receiving an operation of inputting the parameter value to the first sample document, the processor creates a first validation document on the basis of the received parameter value and the first sample document.

A method according to the present disclosure is a method for creating a plurality of types of sample documents and validation documents. The plurality of types of sample documents and validation documents include a first sample document including a plurality of inspection items targeted for a first device and one or more parameter values set for each of the plurality of inspection items, and the plurality of types of validation documents include a first validation document in which a parameter value for each inspection item targeted for the first device is customized. The method includes: receiving a request for creation of a first sample document including an inspection item targeted for the first device; creating the first sample document upon receiving a request for creation of the first sample document; outputting the created first sample document; receiving an operation of inputting the parameter value to the first sample document; and creating the first validation document on the basis of the received parameter value and the first sample document.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a conceptual view illustrating configurations of a first region, a second region, and a third region included in a database.

FIG. 11 is a flowchart illustrating a procedure in which the document creation system updates a fragment document.

FIG. 12 is a view illustrating an example of a screen for creation of a sample document.

FIG. 13 is a view illustrating an example of a screen for selection of a fragment document.

FIG. 14 is a view illustrating an example of a screen for input of a parameter value.

FIG. 15 is a view illustrating an example of a front cover of a validation document.

DESCRIPTION OF THE EMBODIMENTS

Figure 1:
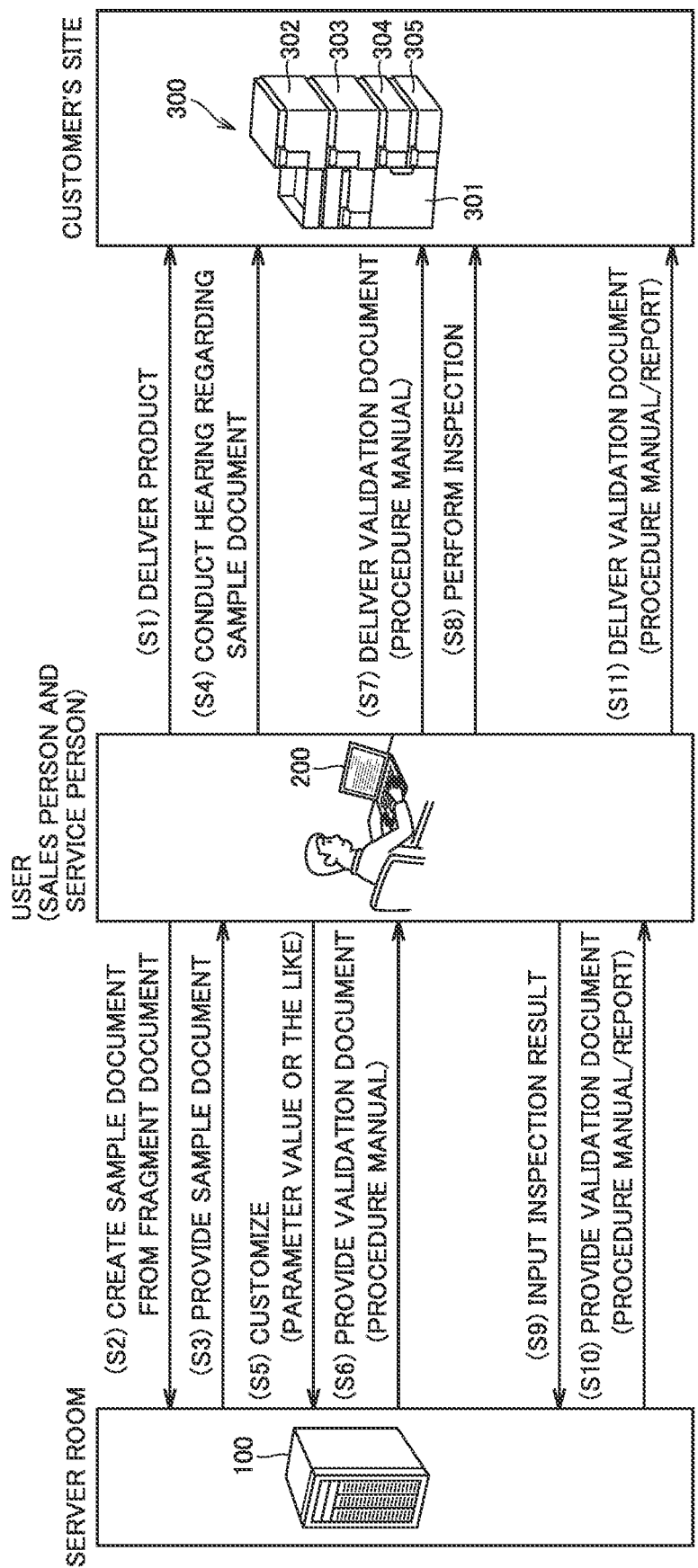
FIG. 1 is a flowchart illustrating an outline of a procedure for creating a validation document.

Hereinafter, an embodiment of the present disclosure will be described in detail with reference to the drawings. In the drawings, the same or corresponding parts are denoted by the same reference numerals, and the description thereof will not be repeated.

FIG. 1 is a flowchart illustrating an outline of a procedure for creating a validation document. A manufacturer that manufactures and sells various devices such as an analysis device creates a validation document for customers. In one of many sites of the manufacturer, a server room is provided. In the server room, a server 100 is disposed. A sales person or a service person of the manufacturer creates a validation document by using server 100 and a terminal device 200. Hereinafter, a sales person and a service person of a manufacturer are referred to as users.

The manufacturer to which the user belongs provides various analysis devices, for customers, such as a liquid chromatograph mass spectrometer, a gas chromatograph mass spectrometer, a thermal analysis device, an atomic absorption spectrophotometer, an X-ray inspection device, and a laser spectrum analyzer. For example, when a liquid chromatograph mass spectrometer is taken as an example, the manufacturer to which the user belongs establishes a product lineup that exhibits performance according to customer needs, from a high-performance liquid chromatograph mass spectrometer having a very large number of functions to a basic liquid chromatograph mass spectrometer simply exhibiting basic functions.

The user delivers a product corresponding to a customer's demand from the product lineup, to a customer's site (step S1). For example, the high-performance analysis device and the basic analysis device are different in the number of units included therein. The manufacturer selects a necessary unit from among various units in accordance with a customer's demand, and assembles an analysis device for the customer with the selected unit. FIG. 1 illustrates, for example, an example in which an analysis device 300 is delivered to a customer's site. As illustrated in FIG. 1, analysis device 300 includes units 301 to 305. Units 301 to 305 each have different functions.

The user prepares a validation document corresponding to, for example, installation qualification (IQ) for analysis device 300 delivered to the customer's site. In general, among analysis devices included in a certain product lineup, validation corresponding to a high-performance analysis device has more types of inspection items than validation corresponding to a basic analysis device. The user changes the types of inspection items to be described in the validation document in accordance with analysis device 300 delivered to the customer's site.

The customer may request the user to customize a parameter value (set value) to be used for validation of analysis device 300. In this case, the user needs to adjust the parameter value in the validation document in accordance with the customer's demand.

In this way, the user needs to create the validation document in consideration of functions of the delivered product and the customer's demand. However, it is inefficient to create the validation document from scratch each time a product is delivered to a customer. Therefore, in the present embodiment, the concepts of "fragment document" and "sample document" are adopted in creating the validation document.

As described above, the manufacturer selects a necessary unit from various units, and assembles the analysis device with the selected unit. This makes it possible to provide a customer with an analysis device equipped with a function according to a customer's demand. In the present embodiment, a similar concept is applied to creation of a validation document. The user creates a validation document describing necessary and sufficient inspection items for a configuration of a device provided to the customer, by selecting a required fragment document from among various fragment documents that may constitute a part of the validation document. The work by user to select the fragment document is similar to, for example, work of selecting a necessary fragment document from a plurality of fragment documents bound in a binder. Server 100 stores a fragment document group for each type of device.

In this way, the fragment document is a document constituting a part of the validation document. Each fragment document may be, for example, a document that constitutes a section of the validation document. Each fragment document is, for example, a document describing some of a plurality of inspection items. The fragment document is a document generated by dividing a large number of inspection items included in the validation document into several units.

The user who has delivered analysis device 300 to the customer's site accesses server 100 by using terminal device 200 such as a notebook computer. The user who has accessed server 100 selects a type of device corresponding to analysis device 300 from among a plurality of types of devices provided by the manufacturer. As a result, the user can access a fragment document group corresponding to analysis device 300. The user creates a sample document by selecting, from the fragment document group, a fragment document necessary for the configuration of analysis device 300 delivered to the customer (step S2).

In this way, a set of the fragment documents selected by the user from the large number of fragment documents is the sample document. The sample document is in a form of a validation document. The sample document is created by exclusively selecting a fragment document necessary for analysis device 300 delivered to the customer, from a large number of fragment documents. Therefore, the sample document does not include inspection items unnecessary for validation of analysis device 300. In other words, in the sample document, inspection items corresponding to the product delivered to the customer are described without excess or deficiency. However, the sample document does not reflect a customer's demand regarding a parameter value of the inspection item. The demand regarding the parameter value of the inspection item varies depending on the customer. For example, there may be a customer who wants to inspect a certain inspection item with a value stricter than a parameter value considered to be standard, and to set a parameter value of another inspection item with a gentle standard to some extent. Therefore, in the present embodiment, after the sample document is provided to a customer, a parameter value according to a customer's demand is set through a hearing with the customer.

Server 100 provides the user with a sample document that has been digitized (step S3). More specifically, server 100 transmits the created sample document to terminal device 200 of the user.

The user goes to the customer's site with the sample document. Alternatively, the user meets with the customer at a web meeting. The user conducts a hearing regarding the sample document, to the customer (step S4). In the sample document, inspection items and inspection parameters corresponding to analysis device 300 are described. The user confirms a parameter value for each inspection item with the customer. The user who has received a demand for the parameter value accesses server 100 by using terminal device 200, and customizes the parameter value of the sample document (step S5). The parameter value of the sample document is customized in accordance with the customer's demand, which allows creation of a validation document (procedure manual) customized for analysis device 300. The created validation document (procedure manual) is stored in server 100.

Server 100 provides the created validation document (procedure manual) to the user (step S6). More specifically, server 100 transmits the created validation document (procedure manual) to terminal device 200 of the user. The user delivers the validation document (procedure manual) to the customer (step S7). The customer confirms that there is no error in the delivered validation document (procedure manual).

The user performs validation of analysis device 300 on the basis of the validation document (procedure manual). For example, the user performs installation qualification (IQ) on the basis of the validation document (procedure manual). The user accesses server 100 by using terminal device 200, and inputs an inspection result to the validation document (procedure manual) (step S9). As a result, the validation document (procedure manual/report) is created. The created validation document (procedure manual/report) is stored in server 100.

Server 100 provides the created validation document (procedure manual/report) to the user (step S10). More specifically, server 100 transmits the created validation document (procedure manual/report) to terminal device 200 of the user.

The user delivers the validation document (procedure manual/report) to the customer (step S11). The customer confirms that there is no error in the delivered validation document (procedure manual/report).

As outlined above, in the present embodiment, a sample document corresponding to a configuration of a device delivered to the customer is created, a parameter value corresponding to an inspection item is confirmed with the customer, and then a validation document is provided to the customer. Therefore, in the process of creating a validation document, a process of re-creating the validation document that is delivered once is not included. As a result, according to the present embodiment, a validation document can be efficiently created.

Moreover, in the present embodiment, in the process of creating a validation document, the sample document is created by assembling, from a fragment document group, a set of documents necessary for the configuration of the device delivered to the customer. Therefore, according to the present embodiment, it is possible to provide the customer with a necessary and sufficient validation document that does not include unnecessary inspection items for the device of the customer.

In general, a manufacturer that provides a customer with various devices such as an analysis device as a product establishes a broad product lineup that exhibits performance according to customer needs, from a high-performance device having a very large number of functions to a basic device simply exhibiting basic functions. Conventionally, the manufacturer creates in advance a validation document covering all functions of individual devices included in a product lineup, and delivers an existing validation document to all customers. For this reason, for example, there has been a problem that a validation document including a large number of unnecessary descriptions is provided to a customer who has purchased a basic device.

However, in the present embodiment, since a set of documents necessary for a configuration of a device delivered to the customer is assembled from a fragment document group to create a sample document, such a problem does not occur.

In addition, conventionally, when an order is individually received from a customer regarding a parameter value to be used for inspection, the manufacturer has created a validation document corresponding to the order from scratch without using the existing validation document. In this way, a specification of the document has been different between the existing validation document and the validation document provided to the customer in response to the individual order. Therefore, it has been necessary for the manufacturer to separately manage a validation document of a customer from which an individual order is received and a validation document of a customer from which no individual order is received.

However, in the present embodiment, the process of creating a validation document is common regardless of a configuration of a device delivered to the customer. That is, in the present embodiment, first, a sample document corresponding to a configuration of a device delivered to the customer is created, a parameter value corresponding to an inspection item is confirmed with the customer, and then a validation document is provided to the customer. Therefore, it is not necessary to separately manage a validation document of a customer from which an individual order is received and a validation document of a customer from which no individual order is received.

In the description using FIG. 1, a document for confirming installation qualification (IQ) is taken as an example of the validation document. However, the present embodiment is assumed to support a plurality of types of validation. Here, in addition to installation qualification (IQ), examples of the types of validation includes; an equipment qualification plan (EQP); operational qualification (OQ), performance qualification (PQ), preventive maintenance (PM), and post repair re-qualification (RQ). Server 100 and terminal device 200 provide various types of validation documents to the user.

Figure 2:
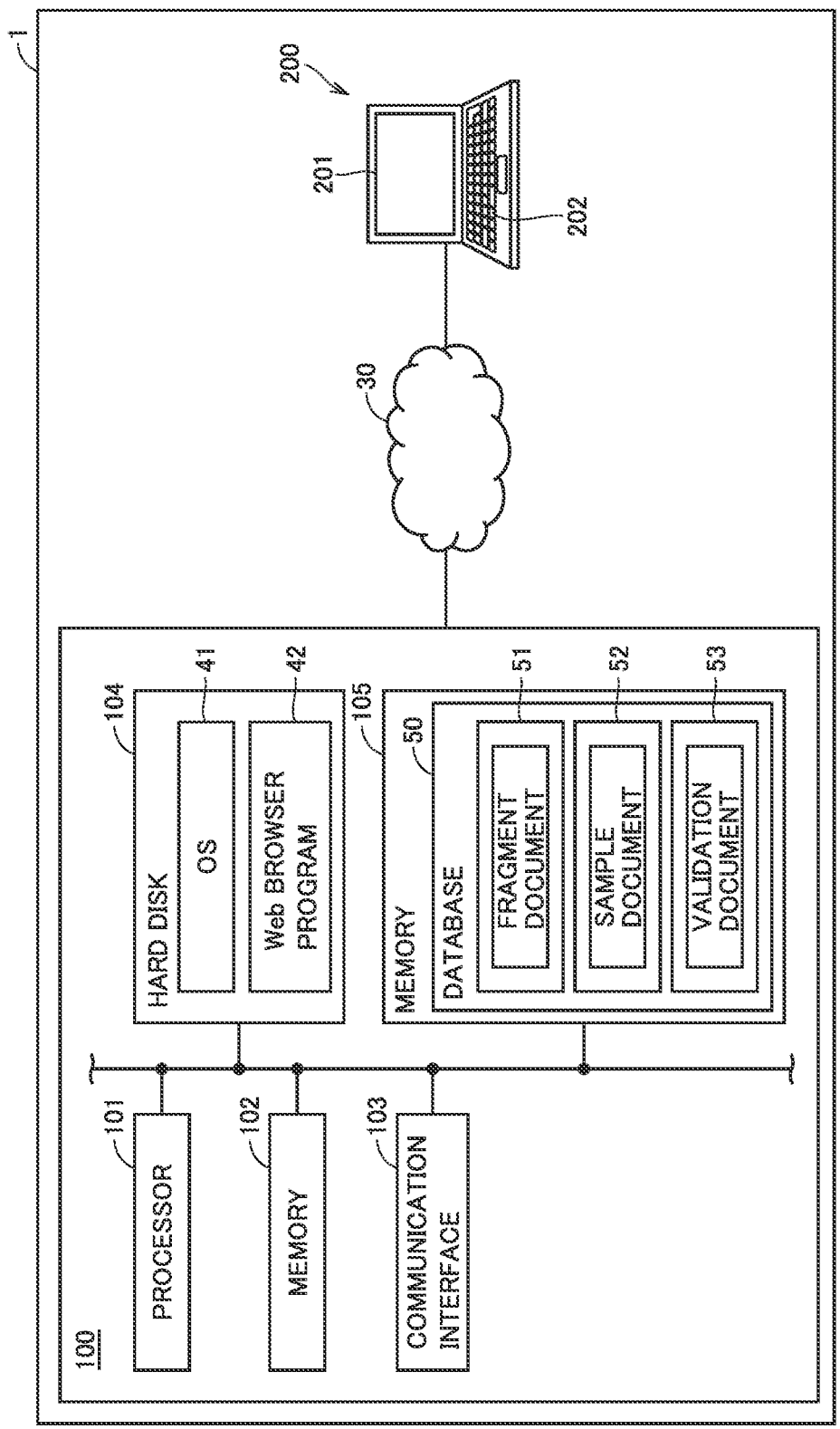
FIG. 2 is a block diagram illustrating a configuration of a document creation system.

FIG. 2 is a block diagram illustrating a configuration of a document creation system 1. Document creation system 1 includes server 100 and terminal device 200. Server 100 and terminal device 200 are connected via a network 30 such as the Internet. Server 100 and terminal device 200 can communicate bidirectionally.

Server 100 includes a processor 101, a memory 102, a communication interface 103, a hard disk 104, a memory 105, and a bus 106.

Processor 101 includes a central processing unit (CPU). Memory 102 is a volatile storage device, and includes, for example, a dynamic random access memory (DRAM).

Hard disk 104 is a nonvolatile storage device. Hard disk 104 stores, for example, an operating system (OS) 41 and a web browser program 42. Hard disk 104 also stores setting data of various applications, for example.

Processor 101 reads a program stored in hard disk 104 into memory 102 and executes the program. Processor 101 is connected to network 30 via communication interface 103.

Memory 105 is realized by a nonvolatile memory. In memory 105, a database 50 is constructed. Database 50 conceptually includes a first region 51, a second region 52, and a third region 53.

In first region 51, fragment documents are stored for each device (for each product category) and for each validation. For example, a manufacturer that operates server 100 provides customers with various devices such as a liquid chromatograph mass spectrometer, a gas chromatograph mass spectrometer, a thermal analysis device, an atomic absorption spectrophotometer, an X-ray inspection device, and a laser spectrum analyzer. The manufacturer has a product lineup for each device.

Further, the manufacturer that operates server 100 provides various types of validation, to customers, such as installation qualification (IQ), equipment qualification plan (EQP), operational qualification (OQ), performance qualification (PQ), preventive maintenance (PM), and post repair re-qualification (RQ).

In first region 51, fragment documents created in advance for each device and each validation are stored.

In first region 51, for example, a fragment document corresponding to installation qualification (IQ) for a liquid chromatograph mass spectrometer is stored. In first region 51, for example, a fragment document corresponding to an equipment qualification plan (EQP) for an atomic absorption spectrophotometer is stored. In first region 51, for example, a fragment document corresponding to installation qualification (IQ) for an atomic absorption spectrophotometer is stored. In first region 51, for example, a fragment document corresponding to an equipment qualification plan (EQP) for an atomic absorption spectrophotometer is stored.

In second region 52, sample documents created by the user are stored. The sample documents are stored in second region 52 for each ID of the customer. The sample document may be given with a unique document ID. In second region 52, the document ID corresponding to the sample document may be stored.

In third region 53, validation documents created by the user are stored. The validation documents are stored in third region 53 for each ID of the customer. The validation document may be given with a unique document ID. The document ID given to the validation document may be common to the document ID of the sample document used for creation of the validation document. In third region 53, the document ID corresponding to the validation document may be stored.

Terminal device 200 includes a display unit 201 including a liquid crystal screen and the like, and an operation unit 202 including a keyboard, a mouse pad, and the like. Terminal device 200 includes a processor and a memory (not illustrated). The processor communicates with server 100 on the basis of a program stored in the memory, and executes processing for creation of a validation document.

Server 100 provides terminal device 200 with an environment for creation of a validation document through a Web application. The document creating application is displayed on display unit 201 via a Web browser. Operation unit 202 receives a GUI operation on the document creating application. The user creates a validation document by the GUI operation.

FIG. 3 is a conceptual view illustrating configurations of first region 51, second region 52, and third region 53 included in database 50.

In first region 51, a plurality of fragment documents are stored for each device and each validation. FIG. 3 illustrates a fragment document corresponding to a certain type of validation XX. Hereinafter, the present embodiment will be described on the basis mainly of fragment documents corresponding to validation XX.

A plurality of fragment documents corresponding to a device A include a document A10001, a document A10002, a document A10003, . . . . The plurality of fragment documents corresponding to device A covers inspection items of all units included in a product lineup of device A. In other words, a validation document created including all of the documents A10001, A10002, A10003, . . . covers inspection items of all units included in the product lineup of device A.

A plurality of fragment documents corresponding to a device B include a document B10001, a document B10002, . . . . The plurality of fragment documents corresponding to device B covers inspection items of all units included in a product lineup of device B. In other words, a validation document created including all of the documents B10001, B10002, B10003, . . . covers inspection items of all units included in the product lineup of device B.

Each of the fragment documents includes a version number. For example, the version number of document A10001 is 3.1. Each of the fragment documents is updated individually as needed. Therefore, the latest version number is different for each fragment document. In first region 51, fragment documents corresponding to all version numbers including a fragment document created first are stored. In first region 51 of FIG. 3, a fragment document corresponding to the latest version number is illustrated. Usually, the user selects a necessary fragment document from fragment documents corresponding to the latest validation number. However, document creation system 1 may be configured to allow the user to designate the version number to select the fragment document.

In first region 51, fragment documents corresponding to a device C, a device D, and a device E . . . are further stored in a form similar to the fragment documents corresponding to device A and device B. By selecting some fragment documents from a fragment document group corresponding to the device delivered to the customer, a sample document corresponding to the device delivered to the customer is assembled.

In second region 52, sample documents are stored for each customer ID. The sample document is specified by source file information. In second region 52, a sample document creation date is stored for each sample document.

The sample document creation date represents a date on which the sample document is created by the user. The source file information includes a document number of a fragment document constituting the sample document and a version number of the fragment document. For example, FIG. 3 illustrates a sample document including document A10001, document A10003, document A10008, . . . . FIG. 3 illustrates an example in which one sample document is stored in correspondence to a customer ID number 111111. For example, in a case where the manufacturer provides three devices to the customer, three sample documents are stored in second region 52 in correspondence to the ID of the customer.

The sample document stored in second region 52 is not deleted even after a validation document based on the sample document is completed. Therefore, the user can read the sample document created in the past and create a new validation document as necessary. In this case, the user can save time and effort to newly create the sample document.

In third region 53, validation documents are stored for each customer ID. The validation document is specified by source file information similarly to the sample document. In third region 53, a validation document completion date is stored for each validation document.

The validation document completion date represents a date on which the validation document is completed. The validation document is completed by recording an inspection result for a target device. Therefore, the validation document completion date means a date on which a validation document (procedure manual/report) functioning as a procedure manual and a report is completed.

The validation document (procedure manual/report) is completed from the sample document through a validation document (procedure manual). When the validation document (procedure manual) is created from the sample document, the validation document (procedure manual) is stored in third region 53. However, at that time, a date is not recorded as the validation document completion date in third region 53. When the validation document (procedure manual/report) is completed on the basis of the validation document (procedure manual), the date is recorded as the validation document completion date in third region 53.

The source file information includes a document number of a fragment document constituting the validation document and a version number of the fragment document. The source file information stored in second region 52 is basically reflected in the source file information stored in third region 53.

Figure 4:
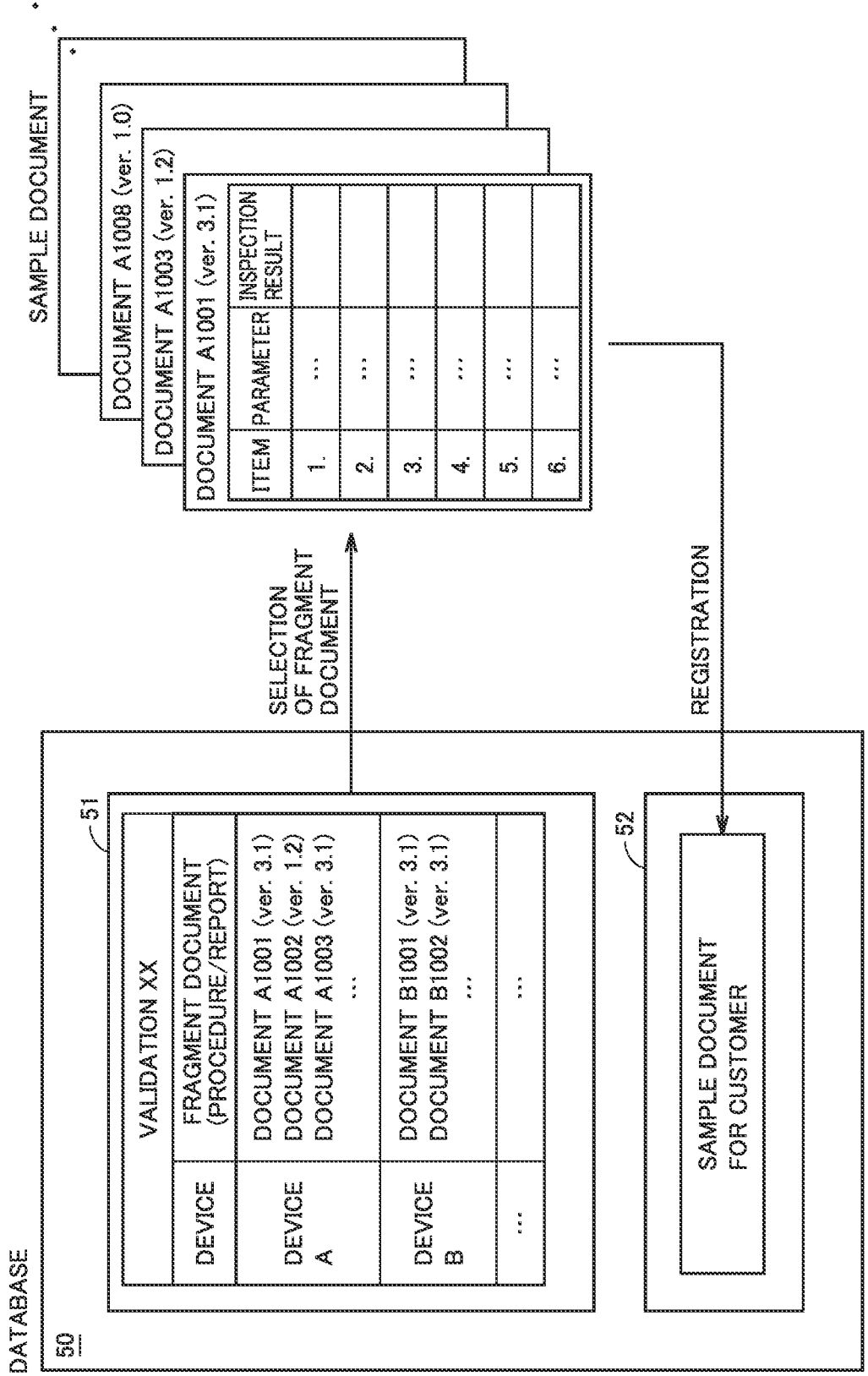
FIG. 4 is a view illustrating a procedure for creating a sample document on the basis of a fragment document in the database.

FIG. 4 is a view illustrating a procedure for creating a sample document on the basis of a fragment document in database 50. The user who has accessed database 50 selects a target device from first region 51. For example, the user who has selected device A selects a necessary fragment document from a plurality of fragment documents corresponding to device A, in accordance with a configuration of the device delivered to the customer. As illustrated in FIG. 4, inspection items of validation are associated with each fragment document. The inspection items include an inspection content, a parameter to be used for inspection, and an inspection result. As the parameter to be used for the inspection, a standard parameter value may be inputted in advance, or no parameter value may be inputted.

The user registers a set of selected fragment documents in database 50 as a sample document for the customer. As a result, the sample document for the customer is stored in second region 52 of database 50.

Figure 5:
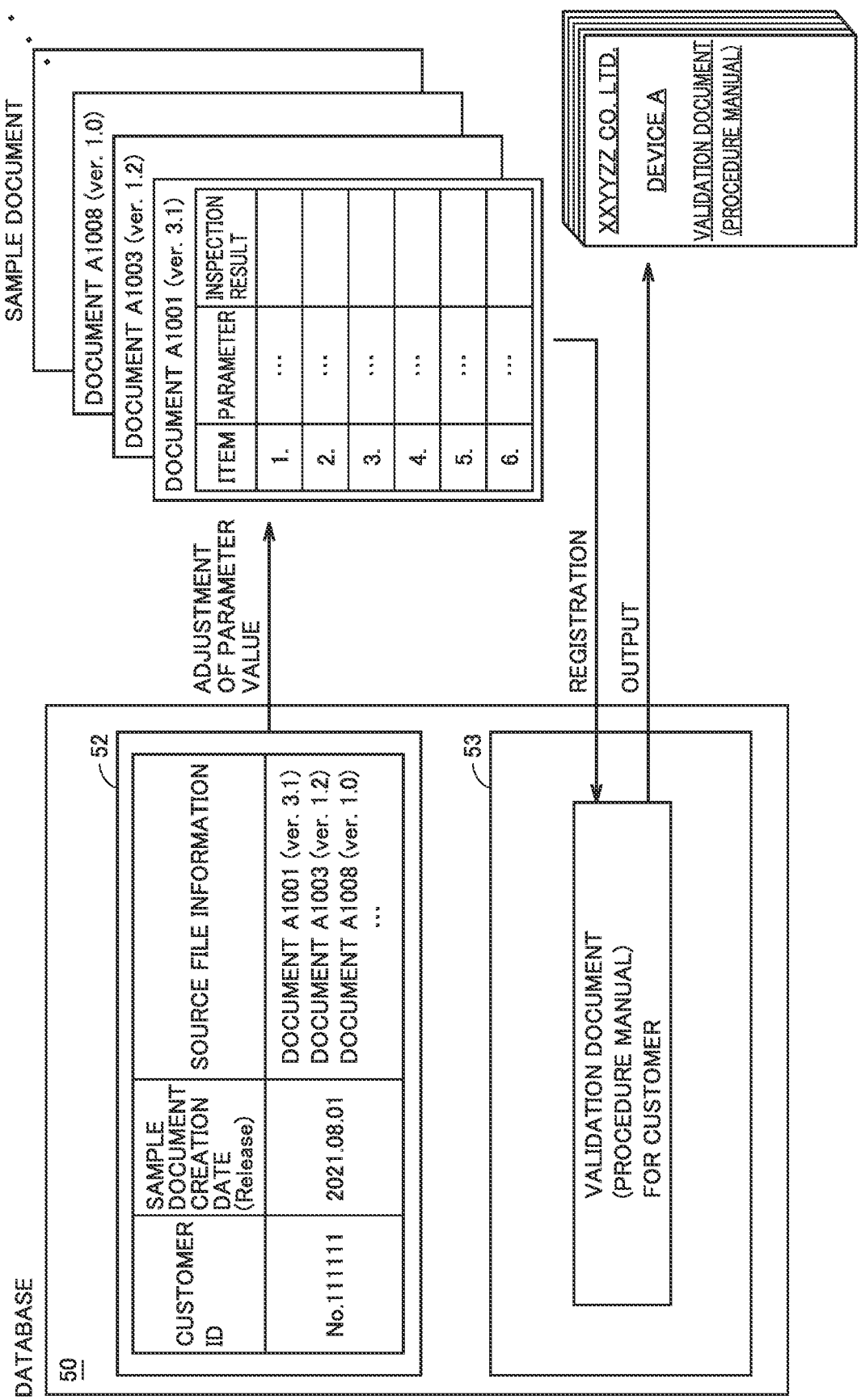
FIG. 5 is a view illustrating a procedure for creating a validation document (procedure manual) on the basis of a sample document stored in the database.

FIG. 5 is a view illustrating a procedure for creating a validation document (procedure manual) on the basis of a sample document stored in database 50. The user who has accessed database 50 selects a target sample document from second region 52. The user who has selected the sample document adjusts a parameter value corresponding to an inspection item in accordance with a customer's demand. The user registers a sample document reflecting the adjusted parameter value in database 50, as the validation document (procedure manual) for the customer. As a result, the validation document (procedure manual) for the customer is stored in third region 53 of database 50.

The user outputs the validation document (procedure manual) stored in third region 53. The user delivers the outputted validation document (procedure manual) to the customer. The user performs validation on the basis of the validation document (procedure manual).

Figure 6:
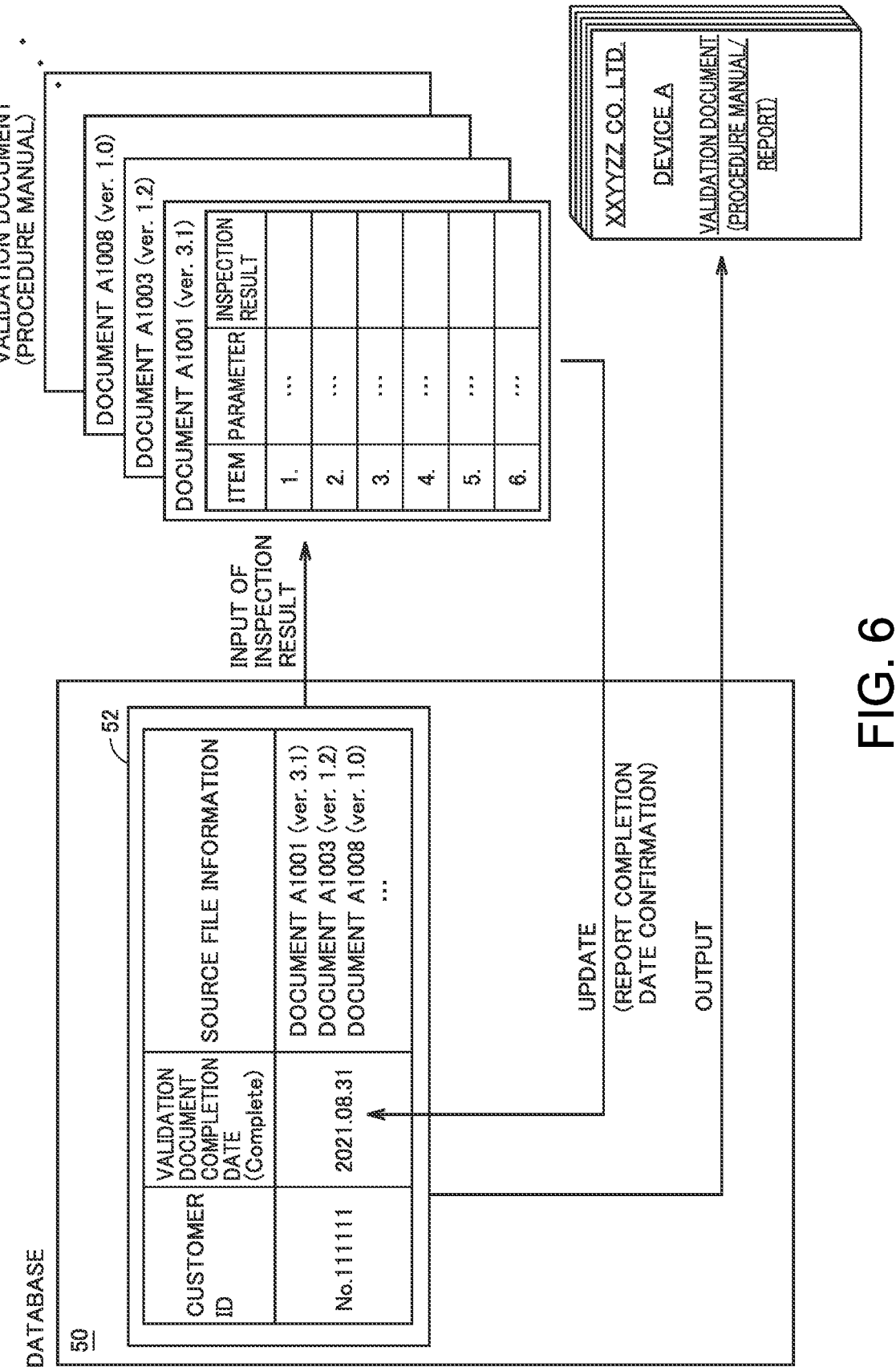
FIG. 6 is a view illustrating a procedure for creating a validation document (procedure manual/report) on the basis of a validation document (procedure manual) stored in the database.

FIG. 6 is a view illustrating a procedure for creating a validation document (procedure manual/report) on the basis of a validation document (procedure manual) stored in database 50. The user who has accessed database 50 selects a target validation document (procedure manual) from third region 53. The user who has selected the validation document (procedure manual) updates the validation document (procedure manual) by reflecting a result of performing validation, in an inspection result field of the validation document (procedure manual). As a result, the validation document (procedure manual/report) for the customer is stored in third region 53 of database 50. At this time, a validation document completion date is recorded in third region 53.

The user outputs the validation document (procedure manual/report) stored in third region 53. The user delivers the outputted validation document (procedure manual/report) to the customer.

Figure 7:
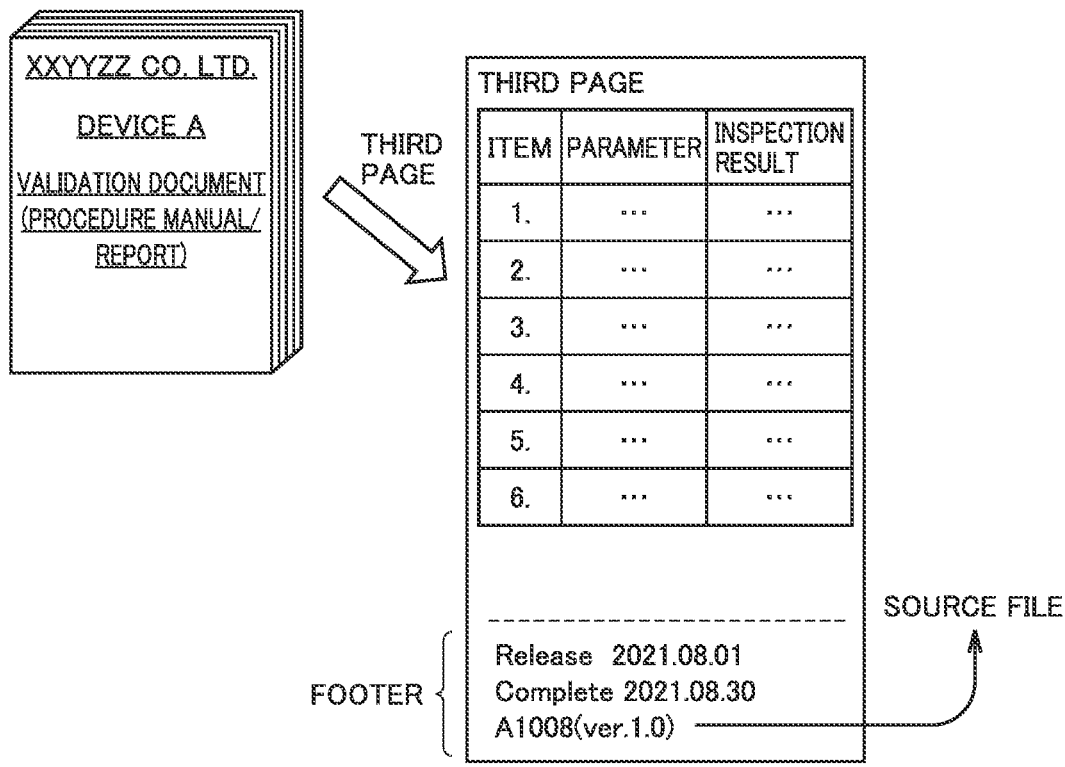
FIG. 7 is a view illustrating information recorded in a footer of a validation document.

FIG. 7 is a view illustrating information recorded in a footer of a validation document. As illustrated in FIG. 7, date information and source file information are printed in a footer portion of a printed validation document. These pieces of information are printed for each page. FIG. 7 illustrates information on the third page of the validation document.

The date information includes two types of information of "Release" and "Complete". A date corresponding to "Release" is a date on which the sample document to be the basis of the validation document has been created. A date corresponding to "Complete" is a date on which the validation document (procedure manual/report) has been created.

The information described as the source file indicates the number and the version number of a fragment document serving as a source of a page on which the source file is printed. The information recorded in the footer of the validation document is managed in database 50. Since these pieces of information are printed in the footer portion of the printed validation document, the customer can specify those pieces of information about the delivered validation document. By using these pieces of information, the customer can prove that the device delivered from the manufacturer and an installation environment complies with FOA changes or international cooperation and national laws and regulations related to ensuring quality, effectiveness, and safety in pharmaceutical production.

Server 100 transmits, to terminal device 200, the validation document in a state where the date information and the source file information are included in the footer portion. Server 100 may arrange the date information and the source file information not in the footer portion but in a header portion.

Next, with reference to flowcharts illustrated in FIGS. 8 to 11, a processing procedure of document creation system 1 will be described. Document creation system 1 including server 100 and terminal device 200 operates in accordance with the flowcharts illustrated in FIGS. 8 to 11. In particular, in server 100, processor 101 accesses database 50 and executes necessary processing. In terminal device 200, a processor included in terminal device 200 executes a web application provided by server 100.

Creation of Sample Document

Figure 8:
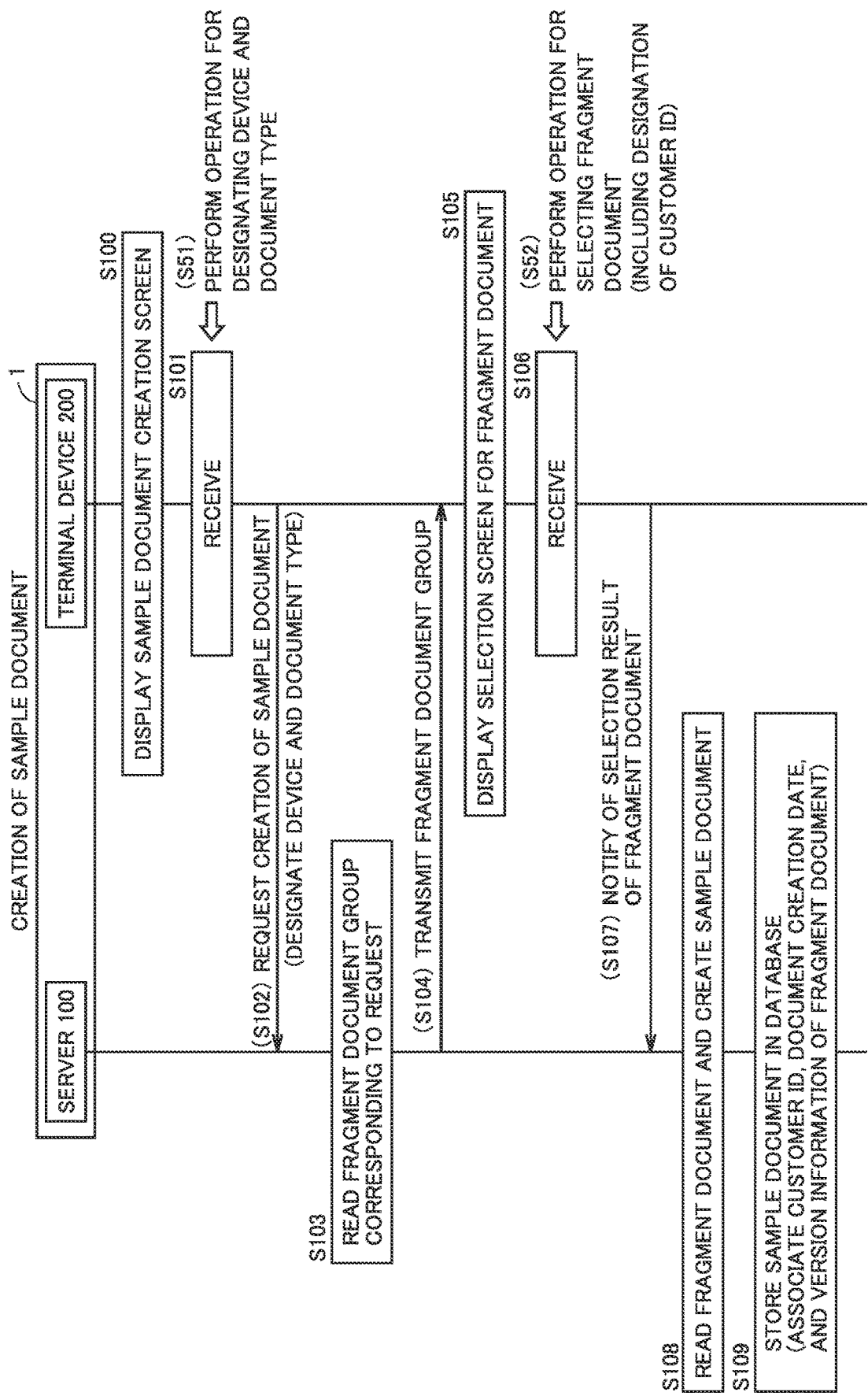
FIG. 8 is a flowchart illustrating a procedure in which the document creation system creates a sample document.

FIG. 8 is a flowchart illustrating a procedure in which document creation system 1 creates a sample document. First, terminal device 200 displays a screen for creation of a sample document, on display unit 201 (step S100). The user operates operation unit 202 of terminal device 200 while viewing the screen, to designate a device and a document type as a target for creation of the sample document (step S51). The user designates a target device for creation of the sample document from among various devices such as a liquid chromatograph mass spectrometer, a gas chromatograph mass spectrometer, and a thermal analysis device.

In step S51, a type of validation document to be created is designated by designating the document type. The type of validation document includes the installation qualification (IQ) and the like already exemplified. The operation for designation in step S51 may include an operation of designating a customer ID of the customer to which the sample document is provided.

Terminal device 200 receives a user's operation (step S101). Thereafter, terminal device 200 transmits a command for requesting creation of the sample document to server 100 (step S102). This command includes the device and document type designated by the user.

Server 100 having received the command reads a fragment document group corresponding to the device according to the request, from first region 51 of database 50 (step S103). Server 100 transmits the read fragment document group to terminal device 200 (step S104). Terminal device 200 receives the fragment document group. Terminal device 200 displays, on display unit 201, a screen for the user to select a necessary fragment document from the fragment document group (step S105).

The user selects a fragment document necessary for a validation document of the device delivered to the customer, while viewing the screen displayed on display unit 201 (step S52). When selecting the fragment document, the user designates a customer ID of the target customer. Terminal device 200 receives an operation of selecting a fragment document (step S106). Terminal device 200 notifies server 100 of a selection result of the fragment document (step S107).

Server 100 reads the fragment document from database 50 on the basis of the notified selection result, and creates a sample document (step S108). Server 100 stores the created sample document in first region 51 of database 50 (step S109). At this time, server 100 associates a customer ID, a creation date of the sample document, and version information of the fragment document, and stores these three pieces of information in first region 51.

In this way, server 100 stores the version information of the fragment document constituting the sample document of the customer. Therefore, the user can create a new validation document by using the sample document created in the past, in accordance with a customer's demand. Note that, at a timing of creating the sample document, server 100 may generate a document ID unique to the sample document. In this case, server 100 may manage the sample document with the document ID.

Creation of Validation Document (Procedure Manual)

Figure 9:
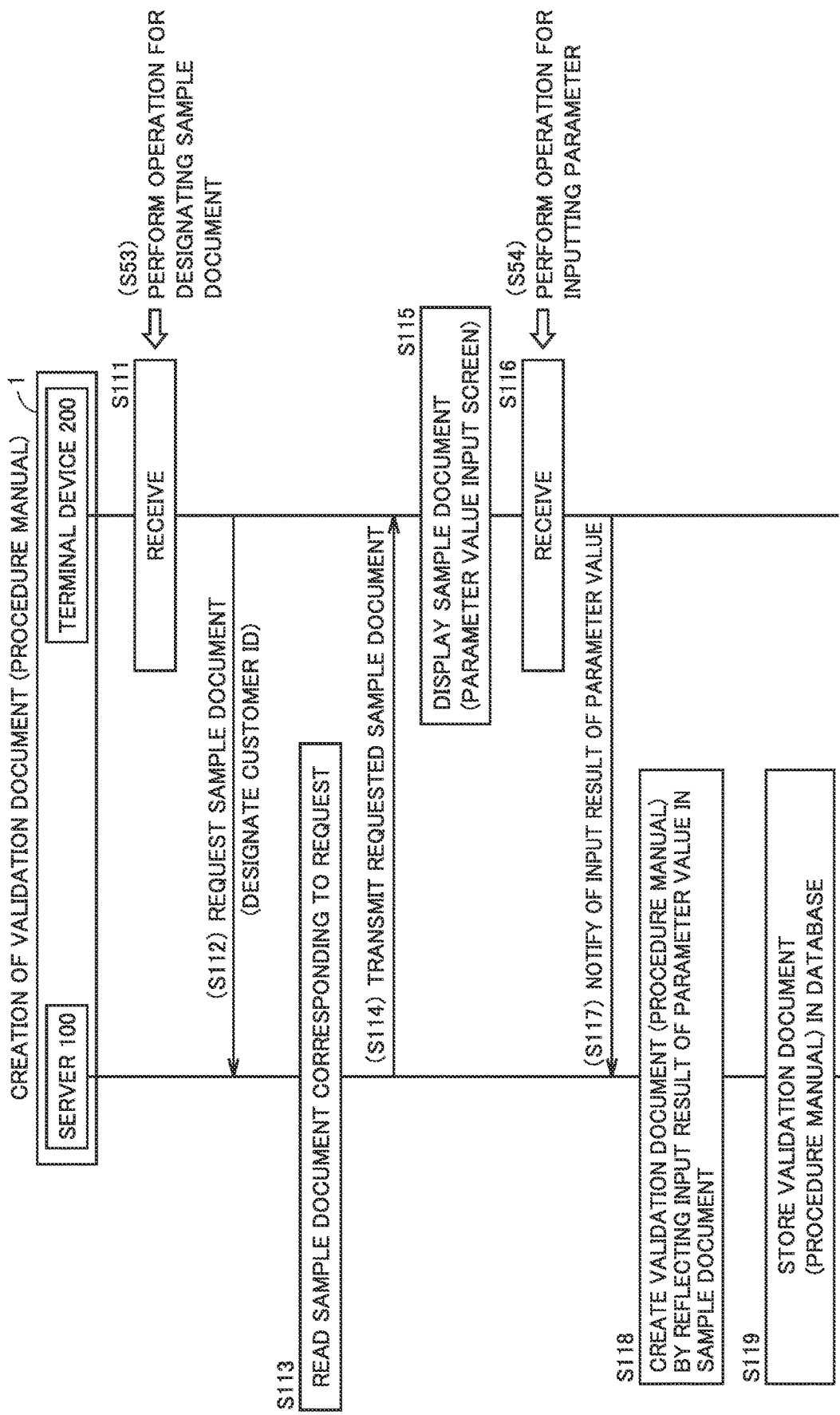
FIG. 9 is a flowchart illustrating a procedure in which the document creation system creates a validation document (procedure manual).

FIG. 9 is a flowchart illustrating a procedure in which document creation system 1 creates a validation document (procedure manual). First, the user operates operation unit 202 of terminal device 200 to designate a sample document to be called (step S53). The user designates, for example, a customer ID. The user may designate a document ID given to the sample document.

Terminal device 200 receives a user's operation for designating the sample document (step S111). Thereafter, terminal device 200 transmits, to server 100, a command for requesting the sample document designated by the user (step S112). This command includes a customer ID designated by the user, and the like.

Server 100 having received the command reads the sample document corresponding to the request, from second region 52 of database 50 (step S113). Server 100 transmits the read sample document to terminal device 200 (step S114). Terminal device 200 receives the sample document. Terminal device 200 displays the sample document on display unit 201 (step S115). The sample document displayed on display unit 201 includes a field for input of a parameter value for each inspection item. Therefore, the user can input the parameter value for each inspection item by using the screen displayed on display unit 201.

The user inputs a parameter value corresponding to a customer's demand for each inspection item, while viewing the screen displayed on display unit 201 (step S54). Terminal device 200 receives an operation of inputting a parameter value (step S116). Terminal device 200 notifies server 100 of an input result of the parameter value (step S117).

Server 100 creates a validation document (procedure manual) by reflecting the input result of the parameter value in the sample document (step S118). At this timing, server 100 may generate a document ID unique to the validation document (procedure manual). Server 100 stores the created validation document (procedure manual) in third region 53 of database 50 (step S119). At this time, server 100 sets document data such that a creation date of the sample document and version information of the fragment document are given to a footer portion of each page of a printed validation document (procedure manual).

Creation of Validation Document (Procedure Manual/Report)

Figure 10:
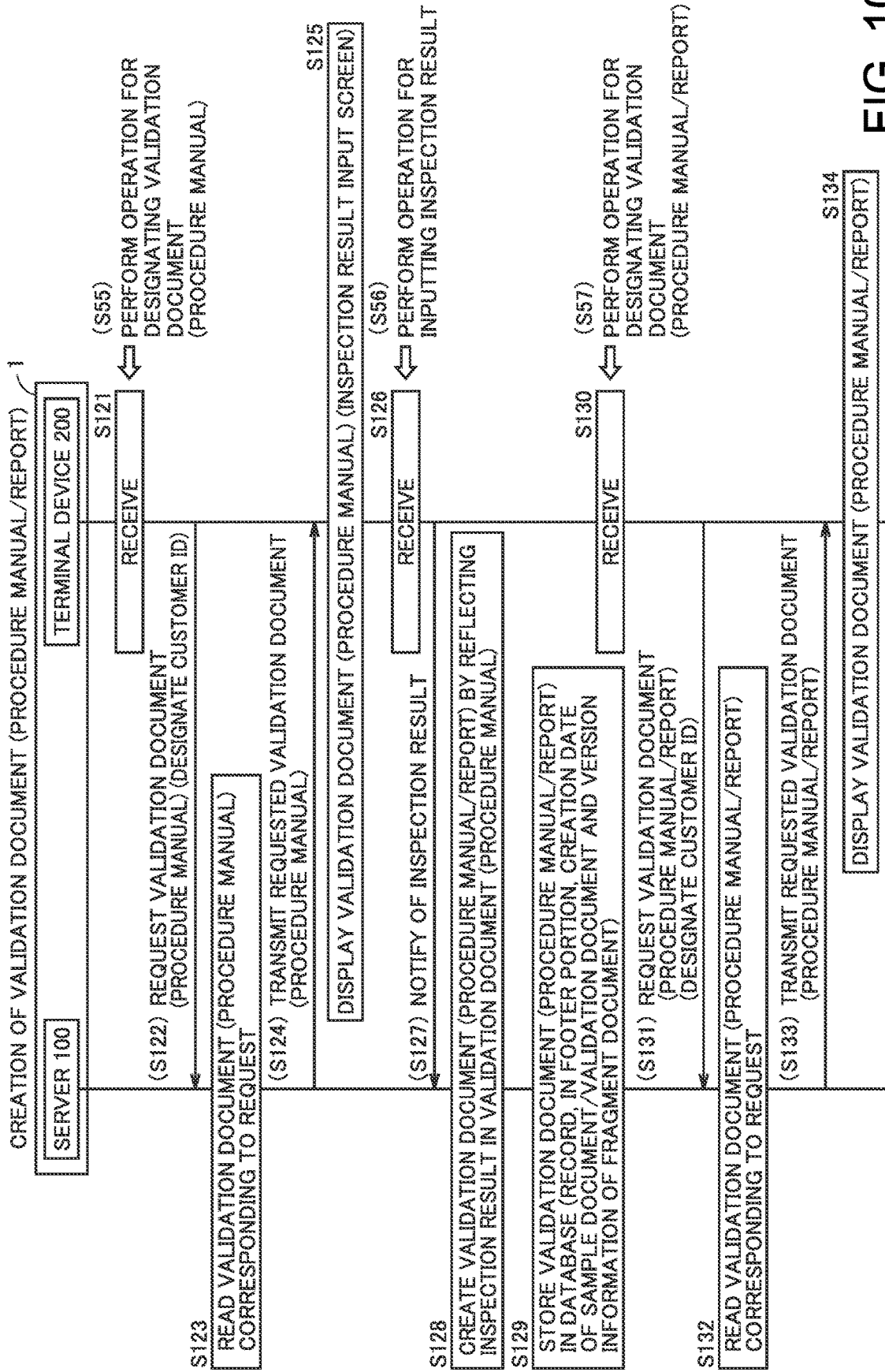
FIG. 10 is a flowchart illustrating a procedure in which the document creation system creates a validation document (procedure manual/report).

FIG. 10 is a flowchart illustrating a procedure in which document creation system 1 creates a validation document (procedure manual/report). First, the user operates operation unit 202 of terminal device 200 to designate a validation document (procedure manual) to be called (step S55). The user designates, for example, a customer ID. The user may designate a document ID given to the validation document.

Terminal device 200 receives a user's operation for designating the validation document (procedure manual) (step S121). Thereafter, terminal device 200 transmits a command for requesting the validation document (procedure manual) designated by the user, to server 100 (step S122). This command includes a customer ID designated by the user, and the like.

Server 100 having received the command reads the validation document (procedure manual) corresponding to the request, from third region 53 of database 50 (step S123). Server 100 transmits the read validation document (procedure manual) to terminal device 200 (step S124). Terminal device 200 receives the validation document (procedure manual). Terminal device 200 displays the validation document (procedure manual) on display unit 201 (step S125). The validation document (procedure manual) displayed on display unit 201 includes a field for input of a validation inspection result for each inspection item. Therefore, the user can input the inspection result for each inspection item by using the screen displayed on display unit 201.

The user inputs the validation inspection result for each inspection item while viewing the screen displayed on display unit 201 (step S56). Terminal device 200 receives an operation of inputting an inspection result (step S126). Terminal device 200 notifies server 100 of the inspection result (step S127).

Server 100 creates the validation document (procedure manual/report) by reflecting the inspection result in the validation document (procedure manual) (step S128). At this timing, server 100 may generate a document ID unique to the validation document (procedure manual/report). Server 100 stores the created validation document (procedure manual/report) in third region 53 of database 50 (step S129).

When storing the validation document (procedure manual/report) in database 50, server 100 records a creation date of the sample document, a creation date of the validation document, and version information of the fragment document in a footer portion of each page of the validation document (procedure manual/report). Note that the validation document (procedure manual) stored in third region 53 is replaced with a newly created validation document (procedure manual/report).

The user designates a validation document (procedure manual/report) to be called, by operating operation unit 202 of terminal device 200 as necessary (step S57). The user designates, for example, a customer ID. The user may designate a document ID given to the validation document.

Terminal device 200 receives a user's operation for designating a validation document (procedure manual/report) (step S130). Thereafter, terminal device 200 transmits a command for requesting the validation document (procedure manual/report) designated by the user, to server 100 (step S131). This command includes a customer ID designated by the user, and the like.

Server 100 having received the command reads the validation document (procedure manual/report) corresponding to the request, from third region 53 of database 50 (step S132). Server 100 transmits the read validation document (procedure manual/report) to terminal device 200 (step S133). Terminal device 200 displays the received validation document (procedure manual/report) on display unit 201 (step S134). Terminal device 200 outputs a signal for printing the validation document (procedure manual/report) to the printer, in response to a user's instruction. The user delivers the acquired validation document (procedure manual/report) to the customer.

Update of Fragment Document

FIG. 11 is a flowchart illustrating a procedure in which document creation system 1 updates a fragment document. First, the user operates operation unit 202 of terminal device 200 to designate a device corresponding to a fragment document to be updated (step S58). The user designates a device for which the fragment document is updated, from among various devices such as a liquid chromatograph mass spectrometer, a gas chromatograph mass spectrometer, and a thermal analysis device.

Terminal device 200 receives the user's operation for designating the fragment document to be updated (step S141). Thereafter, terminal device 200 transmits a command for requesting update of the fragment document designated by the user, to server 100 (step S142). The command includes a type of the device designated by the user, and the like.

Server 100 having received the command reads a fragment document group corresponding to the request, from second region 52 of database 50 (step S143). Server 100 transmits the read fragment document group to terminal device 200 (step S144). Terminal device 200 receives the fragment document group. Terminal device 200 displays, on display unit 201, a screen for selection of the fragment document to be updated, from the fragment document group (step S145).

The user selects a fragment document to be updated while viewing the screen displayed on display unit 201 (step S59). Further, the user inputs the fragment document to be replaced, to terminal device 200 (step S60). Terminal device 200 receives selection of the fragment document to be updated and input of the fragment document to be replaced (step S146). Terminal device 200 notifies server 100 of an update content of the fragment document (step S147).

Server 100 updates the fragment document stored in first region 51 of database 50 in accordance with the notified update content (step S148). At this time, server 100 also updates version information of the fragment document to be updated.

Note that FIG. 11 illustrates an example in which the fragment document is updated in accordance with the user's operation. However, authority to update the fragment document may be given exclusively to an administrator who manages server 100.

FIG. 12 is a view illustrating an example of a screen 210 for creation of a sample document. Screen 210 is displayed on display unit 201 of terminal device 200 in step S100 described above. Screen 210 includes a selection region 211 for selection of a device and selection regions 212 and 213 for selection of a document type.

In selection region 211, names of various devices such as a liquid chromatograph mass spectrometer, a gas chromatograph mass spectrometer, and a thermal analysis device are developed in a vertical direction in a pull-down form. The user selects a name corresponding to a target device for creation of a sample document, from among the names of the devices displayed in selection region 211.

Selection region 212 and selection region 213 are regions for the user to select a document type of validation. Various document types related to validation are shown in selection region 212 and selection region 213.

By selecting any one of "new installation (EQP+IQ+OQ)", "new installation (IQ+OQ)", and "periodic inspection (OQ alone)" shown in selection region 212, the user can select a sample document of a type corresponding to each. For example, when the user selects "new installation (EQP+IQ+OQ)", an EQP sample document, an IQ sample document, and an OQ sample document are selected together.

The user can select a sample document of any document type by checking a portion corresponding to a document type desired to be obtained, among various document types shown in selection region 212. The user can select a document type by using either selection region 212 or selection region 213.

FIG. 13 is a view illustrating an example of screen 220 for selection of a fragment document. Screen 220 is displayed on display unit 201 of terminal device 200 in step S105 described above. On screen 220, a section name constituting the validation document and a necessity check field corresponding to each section name are displayed. Each section corresponds to one fragment document. By using the necessity check field, the user selects a section necessary and sufficient for a configuration of a device delivered to the customer, from the plurality of sections. As a result, the fragment document is selected by the user.

FIG. 14 is a view illustrating an example of a screen 230 for input of a parameter value. Screen 230 is displayed on display unit 201 of terminal device 200 in step S125 described above. On screen 230, an item number field 231, an item name field 232, and a parameter value field 233 related to inspection are displayed. The user inputs a parameter value according to a customer's demand, into parameter value field 233. In parameter value field 233, a standard value may be inputted in advance. In addition, a field for excluding inspection of a certain inspection item from application may be provided on screen 230, in accordance with a customer's demand or the like.

FIG. 15 is a view illustrating an example of a front cover of a validation document. The validation document including the front cover is displayed on display unit 201 of terminal device 200 in step S134 described above. On the front cover, information such as a customer's name, a document number, a device name, a validation document type, a performer's name, a reviewer's name, and a manager/approver's name is written. The user can confirm contents of the validation document for each page by operating operation unit 202 of terminal device 200. The user can print the validation document from a printer connected to terminal device 200, by operating operation unit 202 of terminal device 200.

As described above, by using document creation system 1, the user can create a sample document corresponding to a configuration of a device delivered to the customer, confirm a parameter corresponding to an inspection item with the customer, and then provide a validation document to the customer. Therefore, in the process of creating a validation document, it is not necessary to re-create the validation document that is delivered once. As a result, it is possible to create a validation document at low cost with a small number of man-hours.

Aspects

It is understood by those skilled in the art that the above-described embodiment and modifications thereof are specific examples of the following aspects.

(Paragraph 1) A document creation system according to one aspect is a document creation system for creating a plurality of types of sample documents and validation documents, the document creation system including a server and a terminal device, in which the plurality of types of sample documents include a first sample document including a plurality of inspection items targeted for a first device and one or more parameter values set for each of the plurality of inspection items, the plurality of types of validation documents include a first validation document in which a parameter value for each inspection item targeted for the first device is customized, the server creates a first sample document upon receiving, from the terminal device, a request for creation of the first sample document including an inspection item targeted for the first device, the server transmits the first sample document to the terminal device, the terminal device receives an operation of inputting the parameter value to the first sample document upon receiving the first sample document from the server, and transmits the inputted parameter value to the server, and the server creates the first validation document on the basis of the parameter value received from the terminal device and on the basis of the first sample document.

According to the document creation system described in Paragraph 1, it is possible to efficiently create a validation document while responding to a customer's demand.

(Paragraph 2) In the document creation system according to Paragraph 1, the plurality of types of sample documents and validation documents include a second sample document including a plurality of inspection items targeted for a second device different from the first device and one or more parameter values set for each of the plurality of inspection items, the plurality of types of validation documents include a second validation document in which a parameter value for each inspection item targeted for the second device is customized, the server creates a second sample document upon receiving, from the terminal device, a request for creation of the second sample document including an inspection item targeted for the second device, the server transmits the second sample document to the terminal device, the terminal device receives an operation of inputting the parameter value to the second sample document upon receiving the second sample document from the server, and transmits the inputted parameter value to the server, and the server creates the second validation document on the basis of the parameter value received from the terminal device and on the basis of the second sample document.

According to the document creation system described in Paragraph 2, in addition to the first validation document including a parameter value set for an inspection item targeted for the first device, the second validation document including a parameter value set for an inspection item targeted for the second device can also be efficiently created.

(Paragraph 3) In the document creation system according to Paragraph 1 or 2, the first device is provided to a customer by a plurality of units being selectively combined, the server includes a memory, the memory stores a series of inspection items targeted for the plurality of units of the first device in a state of being divided into a plurality of fragment documents, the server transmits, to the terminal device, selection data for selection of a fragment document to be used for creation of the first sample document from among the plurality of fragment documents upon receiving a request for creation of the first sample document from the terminal device, the terminal device receives an operation of selecting a fragment document to be used for creation of the first sample document upon receiving the selection data from the server, and transmits a selection result to the server, and the server reads the fragment document to be used for creation of the first sample document from the memory on the basis of the selection result received from the terminal device.

According to the document creation system described in Paragraph 3, since the first sample document is created by selecting, from the fragment documents, a fragment document necessary for a configuration of the first device provided to the customer, it is possible to inhibit provision of a validation document including a large number of unnecessary descriptions for the configuration of the first device provided to the customer.

(Paragraph 4) In the document creation system described in Paragraph 3, the server records, in the first validation document, a creation date of the first sample document and version information of a fragment document included in the first validation document.

According to the document creation system described in Paragraph 4, a creation date of the first sample document serving as a source of the first validation document and version information of a fragment document serving as source of the first validation document can by specified in the first validation document itself after completion of the first validation document.

(Paragraph 5) In the document creation system according to Paragraph 3 or 4, the server stores, in the memory in association with each other, the first validation document, version information of a fragment document included in the first validation document, customer information of the first device, and a creation date of the first sample document.

According to the document creation system described in Paragraph 5, when the first validation document is read from the memory, it is possible to specify the version information of the fragment document included in the first validation document, the customer information of the first device, and the creation date of the first sample document.

(Paragraph 6) In the document creation system according to any one of Paragraphs 1 to 5, upon receiving a request for updating at least one of the plurality of fragment documents, the server updates a fragment document corresponding to the received request among the plurality of fragment documents stored in the memory.

According to the document creation system described in Paragraph 6, any fragment document can be selectively updated as necessary, such as when laws are revised.

(Paragraph 7) In the document creation system according to any one of Paragraphs 1 to 6, the server outputs the first validation document to the terminal device, the terminal device receives an operation of inputting an inspection result corresponding to an inspection item of the first validation document, and transmits the inputted inspection result to the server, and the server records the inspection result received from the terminal device, in the first validation document.

According to the document creation system described in Paragraph 7, it is possible to create the first validation document in which the inspection result is recorded.

(Paragraph 8) A server according to another aspect is a server for creating a plurality of types of sample documents and validation documents, the server including a processor and a memory, in which the plurality of types of sample documents and validation documents include a first sample document including a plurality of inspection items targeted for a first device and one or more parameter values set for each of the plurality of inspection items, the plurality of types of validation documents include a first validation document in which a parameter value for each inspection item targeted for the first device is customized, the processor creates a first sample document by using data read from the memory upon receiving a request for creation of the first sample document including an inspection item targeted for the first device, the processor outputs the created first sample document, the processor creates, upon receiving an operation of inputting the parameter value to the first sample document, a first validation document on the basis of the received parameter value and the first sample document.

According to the server described in Paragraph 8, it is possible to efficiently create a validation document while responding to a customer's demand.

(Paragraph 9) A method according to another aspect is a method for creating a plurality of types of sample documents and validation documents, in which the plurality of types of sample documents and validation documents include a first sample document including a plurality of inspection items targeted for a first device and one or more parameter values set for each of the plurality of inspection items, and the plurality of types of validation documents include a first validation document in which a parameter value for each inspection item targeted for the first device is customized, the method including: receiving a request for creation of a first sample document including an inspection item targeted for the first device; creating the first sample document upon receiving a request for creation of the first sample document; outputting the created first sample document; receiving an operation of inputting the parameter value to the first sample document; and creating the first validation document on the basis of the received parameter value and the first sample document.

According to the method described in Paragraph 9, it is possible to efficiently create a validation document while responding to a customer's demand.

Although the embodiment of the present invention has been described, it should be considered that the embodiment disclosed herein is illustrative in all respects and not restrictive. The scope of the present invention is defined by the claims, and it is intended to include all modifications within the meaning and scope equivalent to the claims.

What is claimed is:

1. A document creation system for creating a plurality of types of sample documents and validation documents, the document creation system comprising:
   a server, including a memory, wherein the memory stores a plurality of fragment documents for a plurality of devices and various types of validation, and each of the fragment documents is associated with a plurality of inspection items; and
   a terminal device, wherein
   the plurality of types of sample documents include a first sample document targeted for a first device, the plurality of types of validation documents include a first validation document corresponding to the first sample document, upon receiving, from the terminal device, a request for creation of the first sample document including an inspection item targeted for the first device, the server creates the first sample document including one or more parameter values set for each of the plurality of inspection item targeted for the first device by reading a fragment document group corresponding to the first device from the plurality of fragment documents stored in the memory and selecting a plurality of fragment documents from the fragment document group, the server transmits the first sample document to the terminal device, upon receiving the first sample document from the server, the terminal device receives an operation of inputting the parameter value to the first sample document, and transmits the inputted parameter value to the server, and the server creates the first validation document, in which a parameter value for each inspection item targeted for the first device is customized, based on the parameter value received from the terminal device and based on the first sample document.

2. The document creation system according to claim 1, wherein the plurality of types of sample documents and validation documents include a second sample document including a plurality of inspection items targeted for a second device different from the first device and one or more parameter values set for each of the plurality of inspection items, the plurality of types of validation documents include a second validation document in which a parameter value for each inspection item targeted for the second device is customized, the server creates a second sample document upon receiving, from the terminal device, a request for creation of the second sample document including an inspection item targeted for the second device, the server transmits the second sample document to the terminal device, upon receiving the second sample document from the server, the terminal device receives an operation of inputting the parameter value to the second sample document, and transmits the inputted parameter value to the server, and the server creates the second validation document based on the parameter value received from the terminal device and based on the second sample document.

3. The document creation system according to claim 1, wherein the first device is provided to a customer by a plurality of units being selectively combined, the memory stores a series of inspection items targeted for the plurality of units of the first device in a state of being divided into the plurality of fragment documents, upon receiving the request for creation of the first sample document from the terminal device, the server transmits, to the terminal device, selection data for selection of the fragment documents to be used for creation of the first sample document from among the fragment document group, upon receiving the selection data from the server, the terminal device receives an operation of selecting the fragment documents to be used for creation of the first sample document, and transmits a selection result to the server, and the server reads the fragment document group from the memory and selects the plurality of fragment documents to be used for creation of the first sample document from the fragment document group based on the selection result received from the terminal device.

4. The document creation system according to claim 3, wherein the server records, in the first validation document, a creation date of the first sample document and version information of a fragment document included in the first validation document.

5. The document creation system according to claim 3, wherein the server stores, in the memory in association with each other, the first validation document, version information of a fragment document included in the first validation document, customer information of the first device, and a creation date of the first sample document.

6. The document creation system according to claim 3, wherein, upon receiving a request for updating at least one of the plurality of fragment documents, the server updates a fragment document corresponding to the received request among the plurality of fragment documents stored in the memory.

7. The document creation system according to claim 1, wherein the server outputs the first validation document to the terminal device, the terminal device receives an operation of inputting an inspection result corresponding to an inspection item of the first validation document, and transmits the inputted inspection result to the server, and the server records an inspection result received from the terminal device in the first validation document.

8. A server for creating a plurality of types of sample documents and validation documents, the server comprising:

a processor; and a memory, storing a plurality of fragment documents for a plurality of devices and various types of validation, and each of the fragment documents is associated with a plurality of inspection items, wherein the plurality of types of sample documents and validation documents include a first sample document targeted for a first device, the plurality of types of validation documents include a first validation document corresponding to the first sample document, upon receiving a request for creation of the first sample document including an inspection item targeted for the first device, the processor creates the first sample document including one or more parameter values set for each of the plurality of inspection item targeted for the first device by reading a fragment document group corresponding to the first device from the plurality of fragment documents stored in the memory and selecting a plurality of fragment documents from the fragment document group, the processor outputs the created first sample document, and upon receiving an operation of inputting the parameter value to the first sample document, the processor creates the first validation document, in which a parameter value for each inspection item targeted for the first device is customized, based on the received parameter value and based on the first sample document.

9. A method for creating a plurality of types of sample documents and validation documents, wherein
- a memory stores a plurality of fragment documents for a plurality of devices and various types of validation, and each of the fragment documents is associated with a plurality of inspection items, the plurality of types of sample documents include a first sample document targeted for a first device, and
- the plurality of types of validation documents include a first validation document corresponding to the first sample document,
- the method comprises:
- receiving a request for creation of a first sample document including an inspection item targeted for the first device;
- upon receiving the request for creation of the first sample document, creating the first sample document including one or more parameter values set for each of the plurality of inspection item targeted for the first device by reading a fragment document group corresponding to the first device from the plurality of fragment documents stored in the memory and selecting a plurality of fragment documents from the fragment document group;
- outputting the created first sample document;
- receiving an operation of inputting the parameter value to the first sample document; and
- upon receiving the operation of inputting the parameter value to the first sample document, creating the first validation document, in which a parameter value for each inspection item targeted for the first device is customized, based on the received parameter value and the first sample document.

* * * * *